(12) United States Patent
Kubo et al.

(10) Patent No.: US 7,220,925 B2
(45) Date of Patent: May 22, 2007

(54) INPUTTING APPARATUS

(75) Inventors: Satoko Kubo, Tokyo (JP); Hiroyuki Ohnuma, Chiba (JP); Haruhiko Yata, Kanagawa (JP); Johnny Sin, Hong Kong (CN)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 11/225,324

(22) Filed: Sep. 13, 2005

(65) Prior Publication Data

US 2006/0054476 A1    Mar. 16, 2006

(30) Foreign Application Priority Data

Sep. 15, 2004  (CN) .................. 2004 1 0089924

(51) Int. Cl.
*H01H 9/00* (2006.01)
(52) U.S. Cl. .............. 200/5 A; 200/520; 200/341; 455/575.1; 400/472
(58) Field of Classification Search ............. 200/5 A, 200/1 R, 520–521, 293–294, 341, 345; 455/575.1–575.5, 455/556.1; 400/492, 477, 488
See application file for complete search history.

(56) References Cited

U.S. PATENT DOCUMENTS

| | | | | |
|---|---|---|---|---|
| 4,633,323 A | * | 12/1986 | Haberkern et al. | ......... 348/838 |
| 4,899,368 A | * | 2/1990 | Krohn et al. | ............ 379/88.11 |
| 5,978,215 A | * | 11/1999 | Chiu et al. | .................. 361/687 |
| 6,629,794 B2 | * | 10/2003 | Cauwels | ..................... 400/492 |
| 6,885,314 B2 | * | 4/2005 | Levin et al. | .................. 341/20 |
| 7,107,083 B2 | * | 9/2006 | Watanabe | ................ 455/575.3 |

* cited by examiner

*Primary Examiner*—Richard K. Lee
(74) *Attorney, Agent, or Firm*—Frommer Lawrence & Haug LLP; William S. Frommer; Thomas F. Presson

(57) ABSTRACT

This invention provides an inputting apparatus with a reduced number of lines in its connection cable, a simplified structure and improved reliability. The present invention discloses a folding type of inputting apparatus, comprising a first operation housing and a second operation housing coupled together by a hinge section, the first operation housing has a first button group consisted of a plurality of input buttons and is mainly held by the user, the second housing has a second button group consisted of a plurality of input buttons, characterized in that in said second operation housing, a main substrate on which a main control unit is mounted is provided and in said first operation housing, a sub-substrate on which a sub-control unit is mounted is provided, said sub-control unit determines which input button in the first input button group on the first operation housing has been operated, makes a conversion into the serial data corresponding to this operated input button, and transmits the serial data to the main control unit on the main substrate.

7 Claims, 15 Drawing Sheets

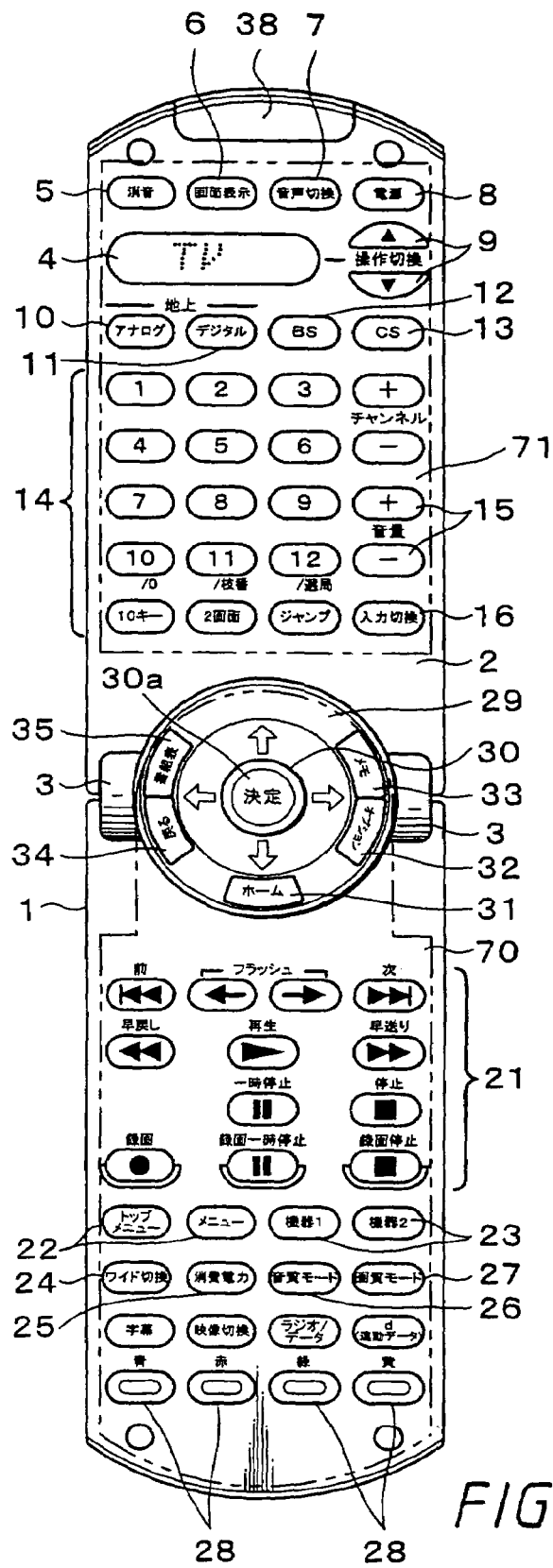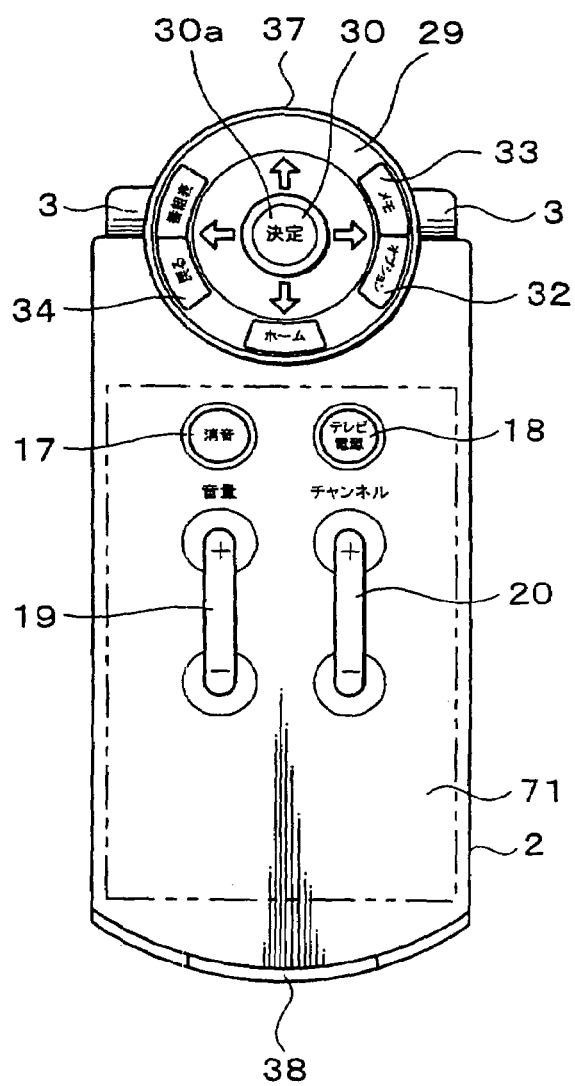
FIG. 10A
FIG. 10B

INPUTTING APPARATUS

BACKGROUND OF THE INVENTION

This invention relates to inputting apparatuses, such as a remote commander for remotely operating an electronic equipment like a television receiver, and in particular relates to inputting apparatuses which are compacted by using a folding structure and easy to operate as well.

For operation of AV (audio-visual) devices like television receivers and optical disk players for home use, or other electronic equipment, recently, almost all of them can be operated remotely by using a remote commander (called a remote controller below).

Take the remote controller for TV as an example, a recent type of remote controller for TV has already been proposed (see, for example, Patent Document 1), which comprises a select button for selecting BS (broadcasting satellite) high-definition or BS digital broadcasting, surface wave analog broadcasting, surface wave digital broadcasting, CS (communication satellite) digital broadcasting or data broadcasting, and an operation button for selecting channels.

Moreover, a remote controller that has, other than the operation button for these broadcast selections, a button for operating a video player on one remote controller, has also been proposed.

From the foregoing, for the recent remote controller, the number of operation buttons is getting more and there is a trend that the remote controller itself gets longer in longitudinal direction and larger. However, that the remote controller getting larger in size has made the remote controllers more difficult to operate and has brought about a problem that operation itself becomes more complicated and less user-friendly, because a lot of buttons are placed on the same surface.

Therefore, because of such reasons, remote controllers of a folding type have been proposed (see, for example, Patent Document 2).

[Patent Document 1] Japanese Laid-Open Patent Publication 2001-346281

[Patent Document 2] Japanese Laid-Open Patent Publication H05-211693

When making a remote controller into a folding type, making a first operation housing having a first button group consisted of a plurality of input buttons and being mainly held by the user, and a second housing having a second button group consisted of a plurality of input buttons to fold and overlap using a hinge section can be considered.

In this case, as shown in FIG. 16, in one operation housing, a sub-substrate 50 is provided and in the other operation housing, a main substrate 51 is provided. To illustrate by reference to FIG. 16, 52 shows a microcomputer-based control unit mounted on the main substrate 51, and is controlled by the keys in response to the input button operation of the second input button group provided on the other operation housing. The key code signals corresponding to the keys of a key matrix 53 on the main substrate 51 are supplied to this control unit 52, and this control unit 52 generates control code signals in response to this input button operation.

Moreover, the key code signals corresponding to the keys from the key matrix 54 of the sub-substrate 50 are supplied via a connection cable 55 to the control unit 52 on the main substrate 51. The key code signals control the keys in response to the operation of the input buttons of the first input button group on the one operation housing. This control unit 52 generates control signals in response to the operation of this input button.

The control code signals generated by this control unit 52 are supplied to an infrared light emitting diode (LED) 56 for transmission on the main substrate 51, and at the same time supplied via the connection cable 55 to a first transmitting infrared light emitting diode (LED) 57 on the sub-substrate 50.

Moreover, on the main substrate 51, a liquid crystal display (LCD) panel 58 of the display section is mounted, and the display signals from this control unit 52 are supplied to this liquid crystal display panel 58 of the display section. As shown in FIG. 16, a battery 59 used as power supply is mounted on the sub-substrate 50, the power from this battery 59 is supplied to the first transmitting infrared light emitting diode 57, and at the same time the power from this battery 59 is supplied through the connection cable 55 to the control unit 52, the second transmitting infrared light emitting diode 56 and display section's liquid crystal display panel 58.

Moreover, 60 indicates a reed switch mounted on the other operation housing. When the other operation housing is folded up, this reed switch 60 is opposite to a permanent magnet 61 mounted on the one operation housing and makes this reed switch on.

The on/off signals of this reed switch are supplied to the control unit 52. When this reed switch 60 is on, the control code signal from this control unit 52 is supplied to the first transmitting light emitting diode 57 but not to the second transmitting light emitting diode 56. When this reed switch 60 is off, the control code signal from the control unit 52 is supplied to the second transmitting light emitting diode 56 but not to the first transmitting light emitting diode 57.

When such a folding type remote controller is configured as shown in FIG. 16, the number of lines of the connection cable 55 is large, for example 17 lines, which makes its structure complicated and results in an undesired condition that the reliability becomes lower and cost higher.

In view of the above mentioned problems, the object of the present invention is to reduce the number of cable lines and simplify the structure of the connection cable, so as to provide a connection cable with improved reliability and lower cost.

SUMMARY OF THE INVENTION

The input device of the present invention is a device designed to be of folding type, comprising a first operation housing and a second operation housing coupled together by a hinge section, the first operation housing has a first button group consisted of a plurality of input buttons and is mainly held by the user, the second housing has a second button group consisted of a plurality of input buttons, wherein, in said second operation housing, a main substrate on which a main control unit is mounted is provided and in said first operation housing, a sub-substrate on which a sub-control unit is mounted is provided, said sub-control unit determines which input button in the first input button group on the first operation housing has been operated, makes a conversion into the serial data corresponding to this operated input button, and transmits the serial data to the main control unit on the main substrate.

According to the present invention, the sub-control unit mounted on the sub-substrate determines which input button in the first input button group on the first operation housing is operated and makes a conversion into serial data corresponding to this operated input button, and transmits the serial data to the main control unit on the main substrate;

therefore, the number of lines of the connection cable between the sub-substrate and the main substrate can be reduced, for example, reduced to 5 lines. In this way, the structure can be simplified, the reliability improved and the manufacturing cost lowered.

BRIEF DESCRIPTION OF THE DRAWINGS

FIG. 10A and FIG. 10B are plans for illustrating this invention.

Figures 13A, 13B:
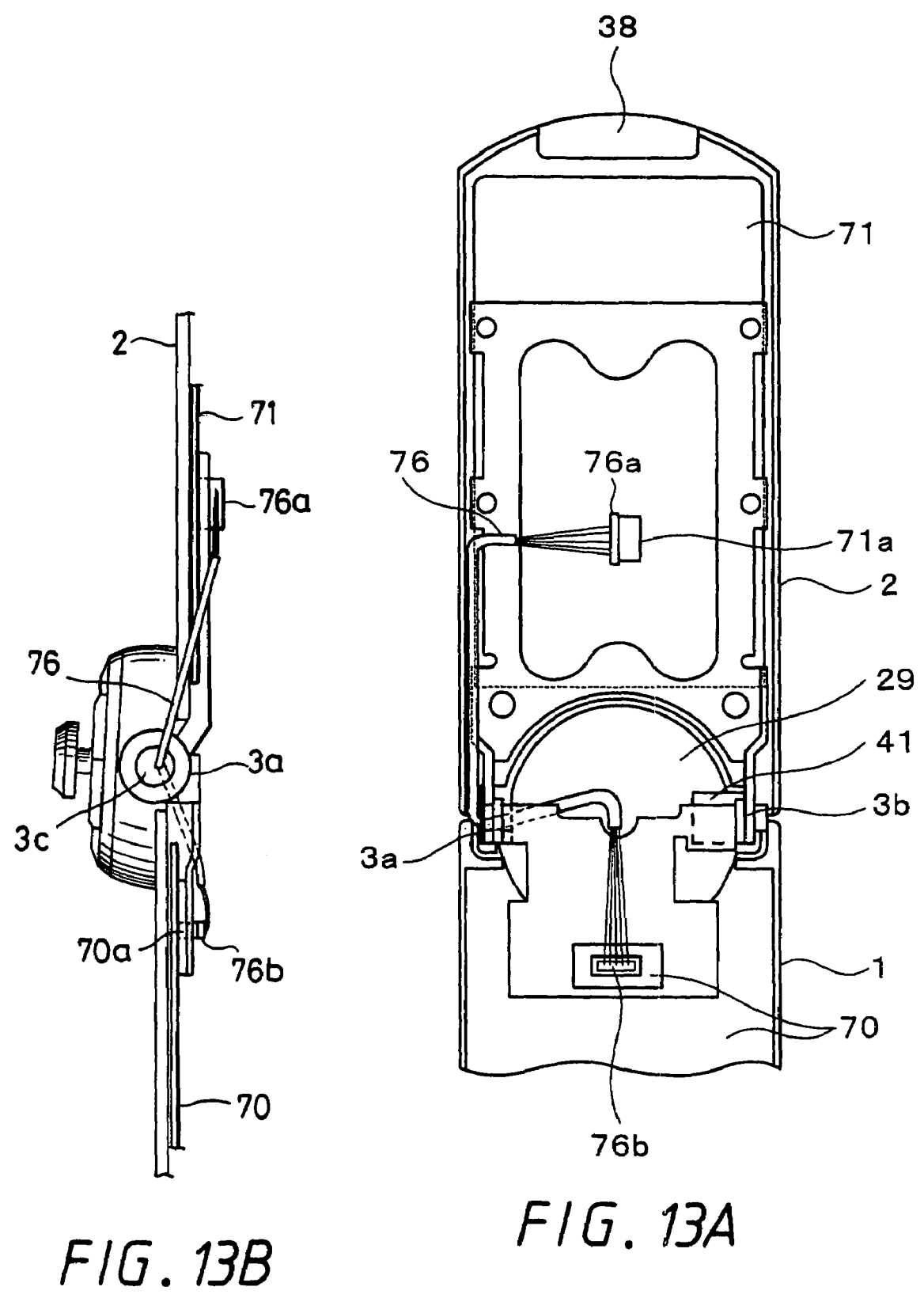

FIG. 13A is a plan and FIG. B is a side view, both for illustrating the main sections of this invention.

DETAILED DESCRIPTION

Preferred embodiments of inputting apparatuses according to the prevent invention, for example, the folding type remote controllers with which TV sets and video players can be operated will be explained hereinafter with reference to the attached drawings.

Figure 1:
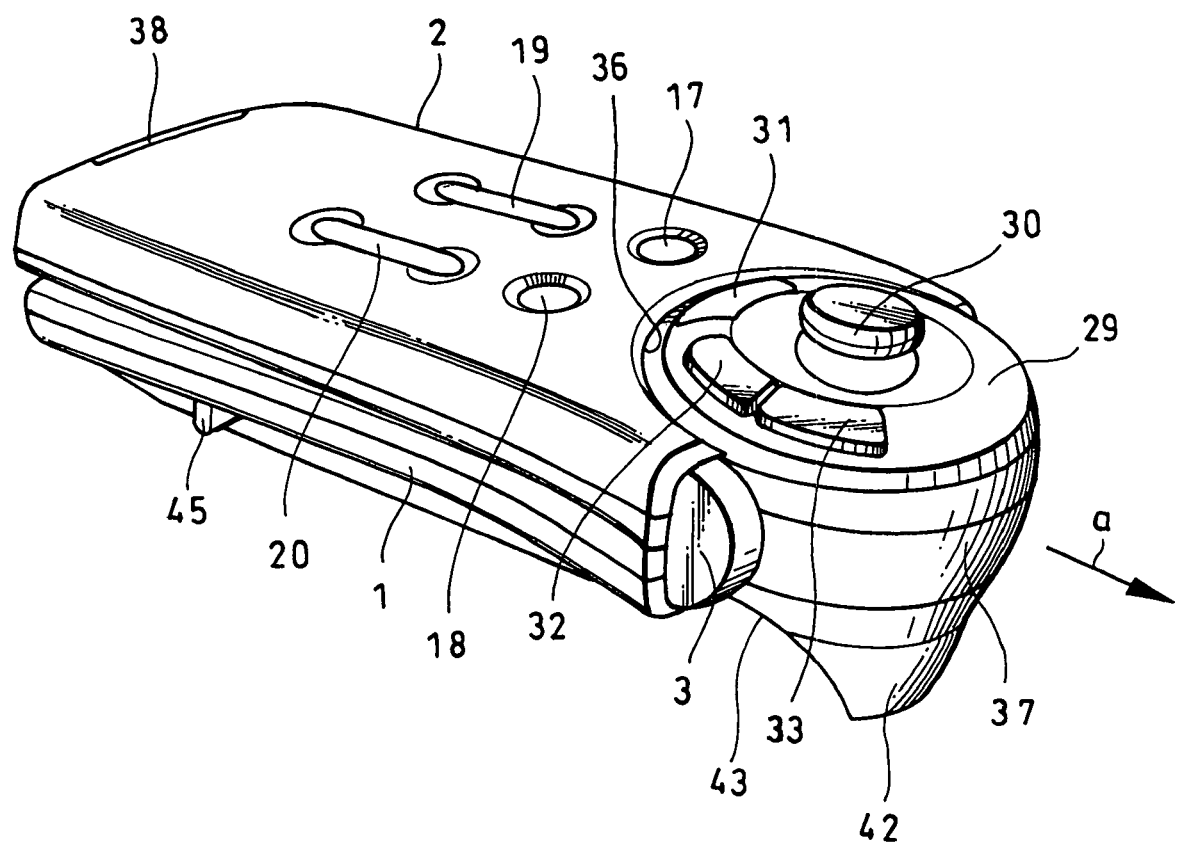
FIG. 1 is a perspective view showing the top view of a remote controller when folded up.
Figure 2:
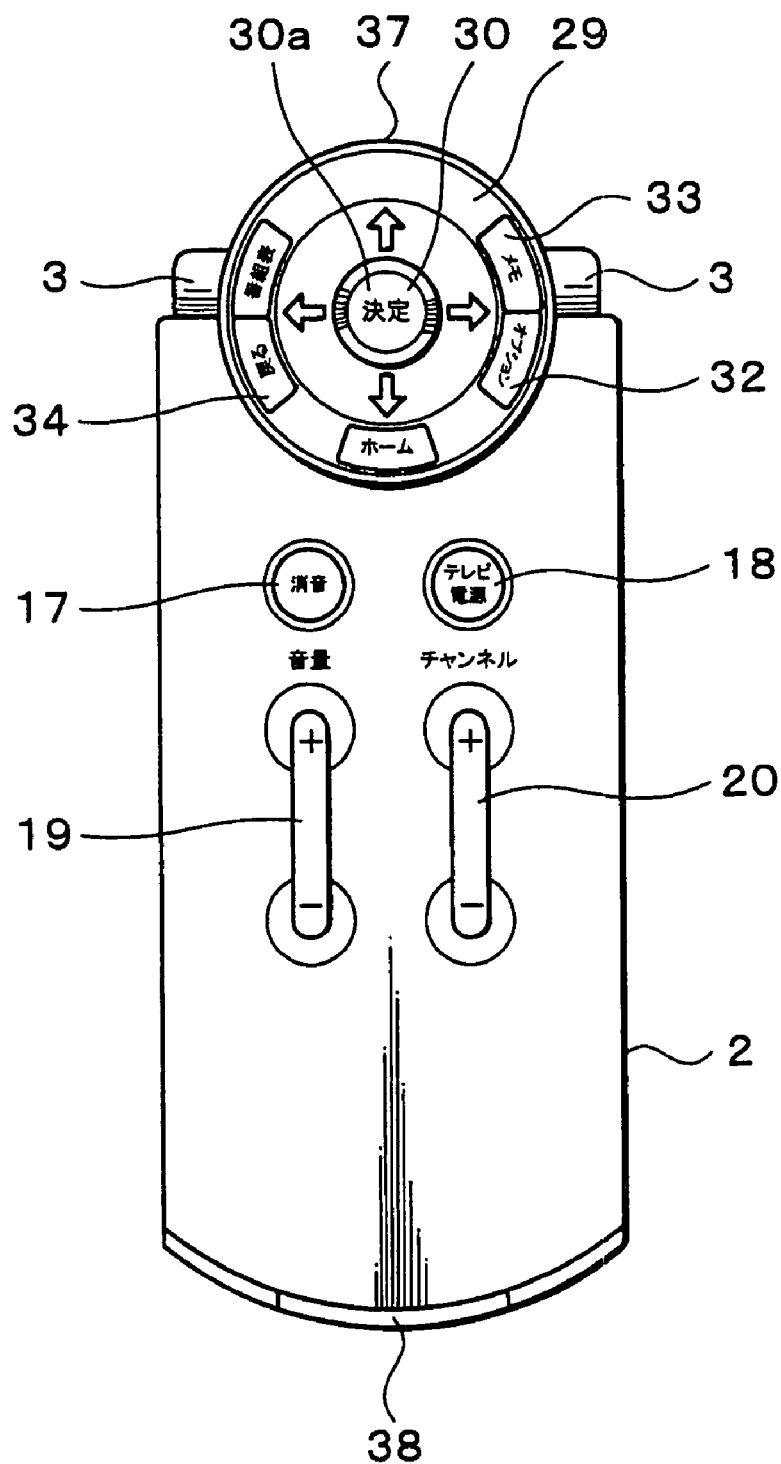
FIG. 2 is a plan showing the top view of a remote controller when folded up.
Figure 3:
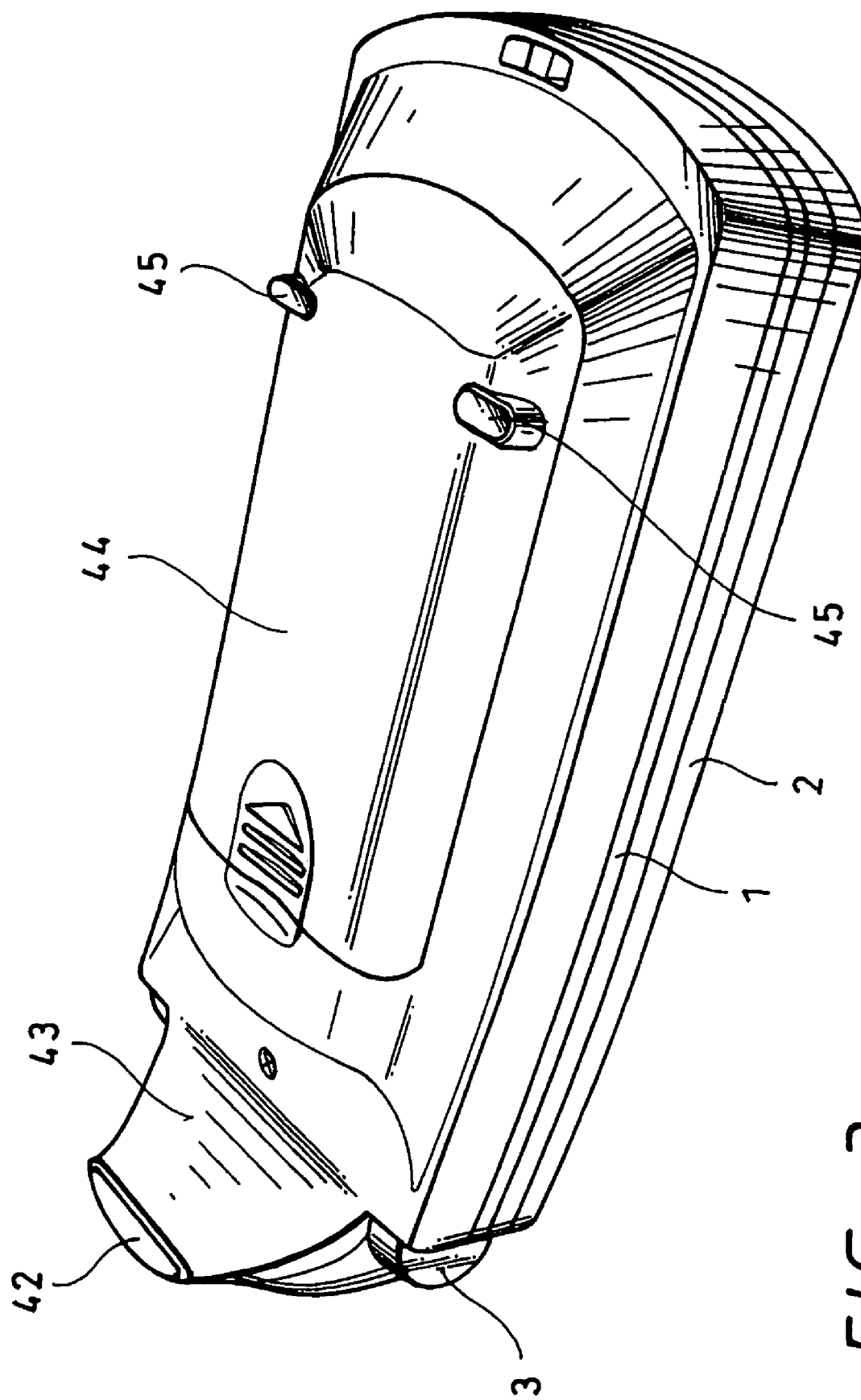
FIG. 3 is a perspective view showing the bottom view of a remote controller.
Figure 4:
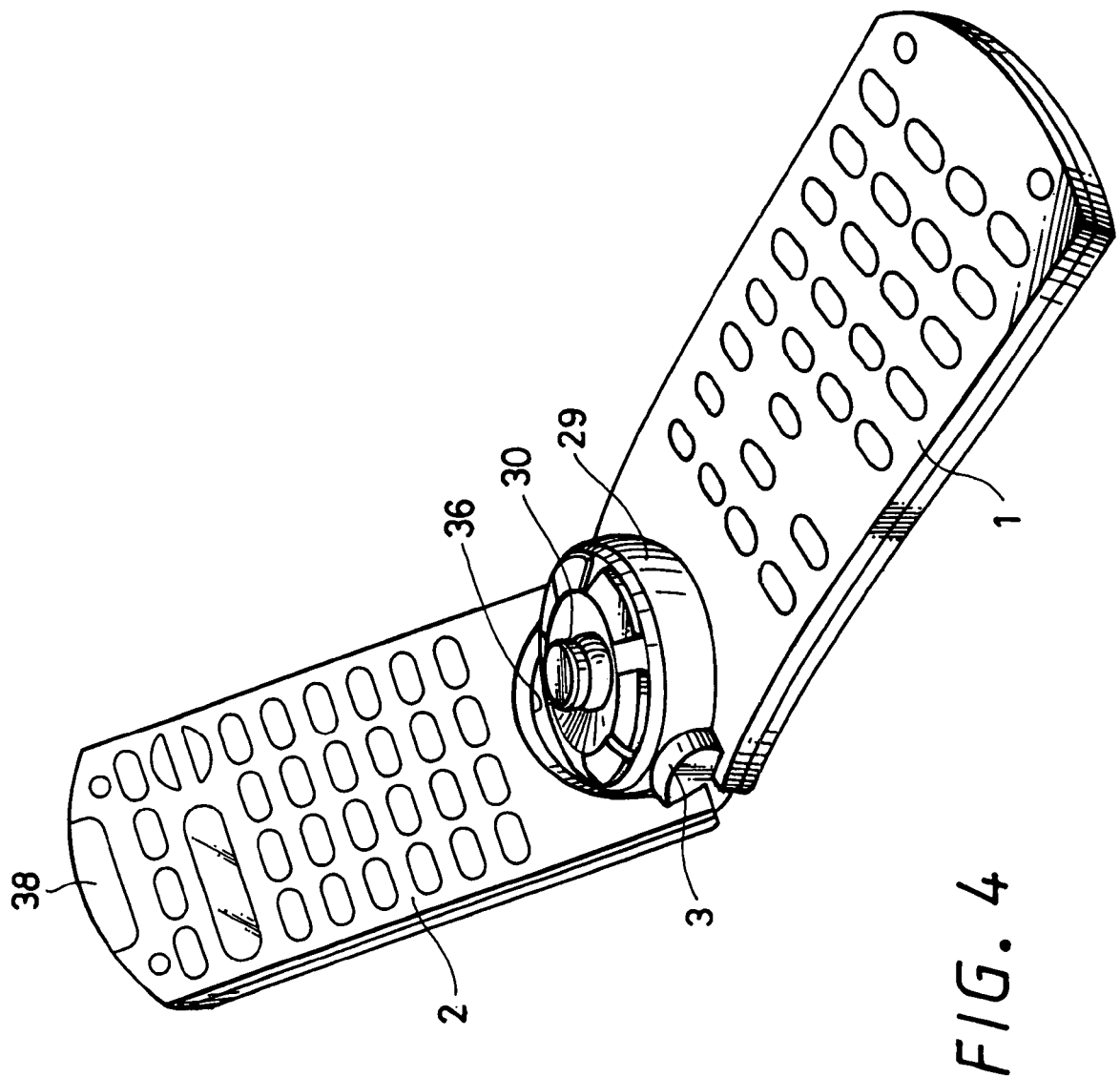
FIG. 4 is a perspective view showing a remote controller when half-opened.
Figure 5:
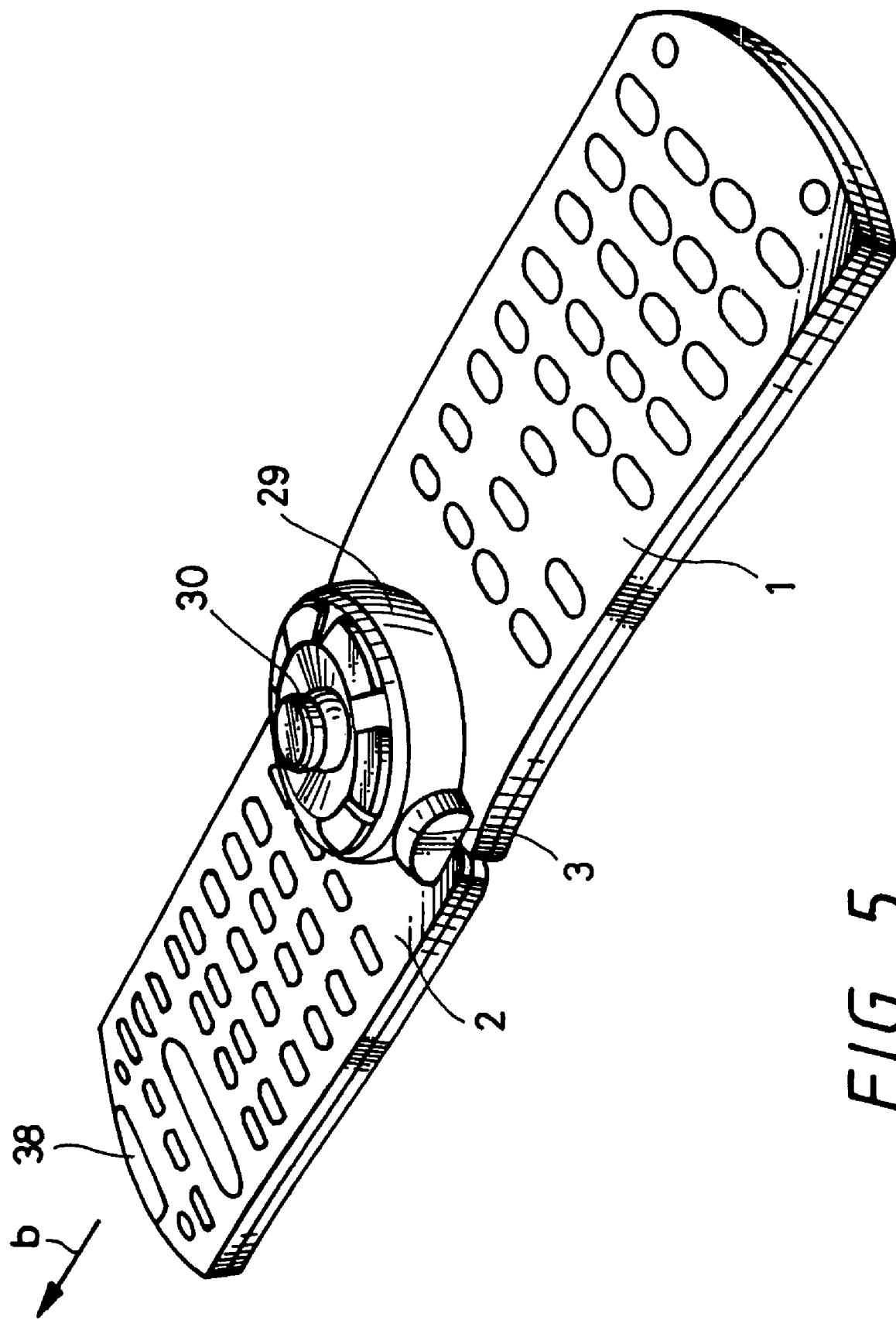
FIG. 5 is a perspective view showing the top view of a remote controller when fully opened.
Figure 6:
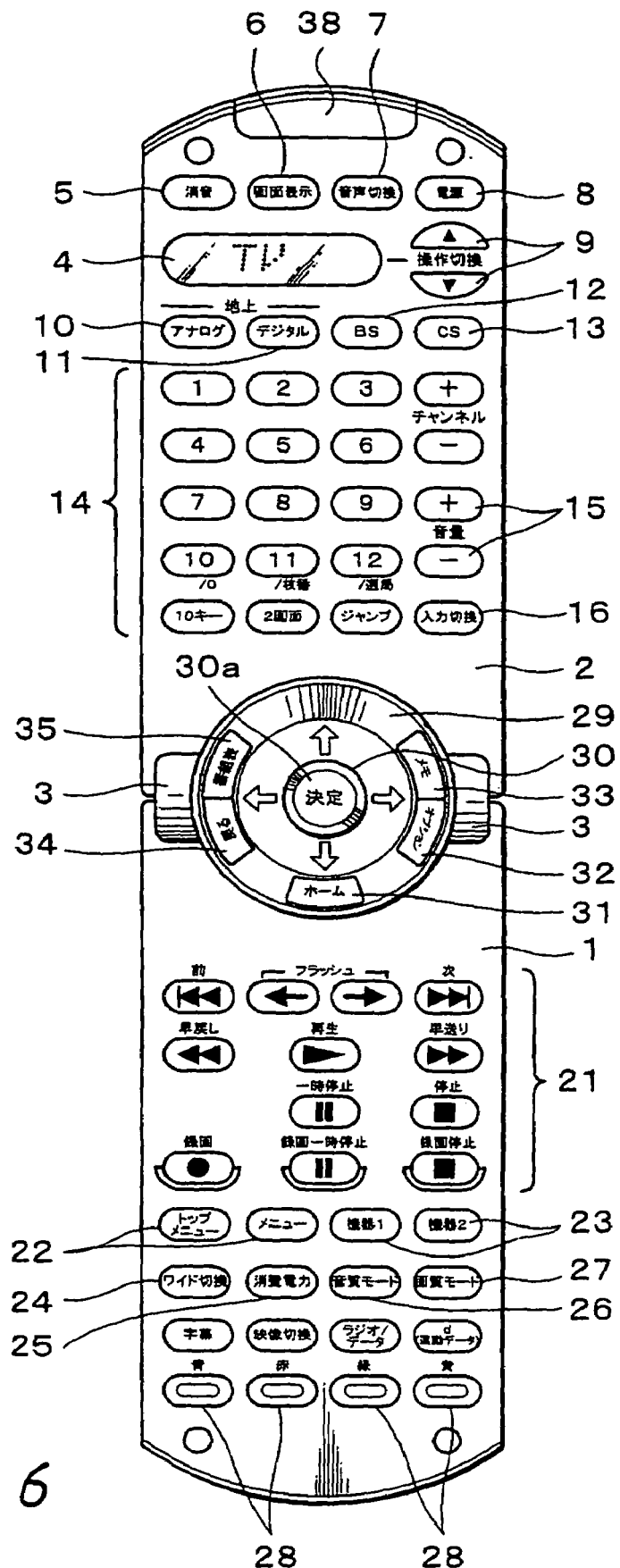
FIG. 6 is a plan showing the top view of a remote controller when opened.
Figure 7:
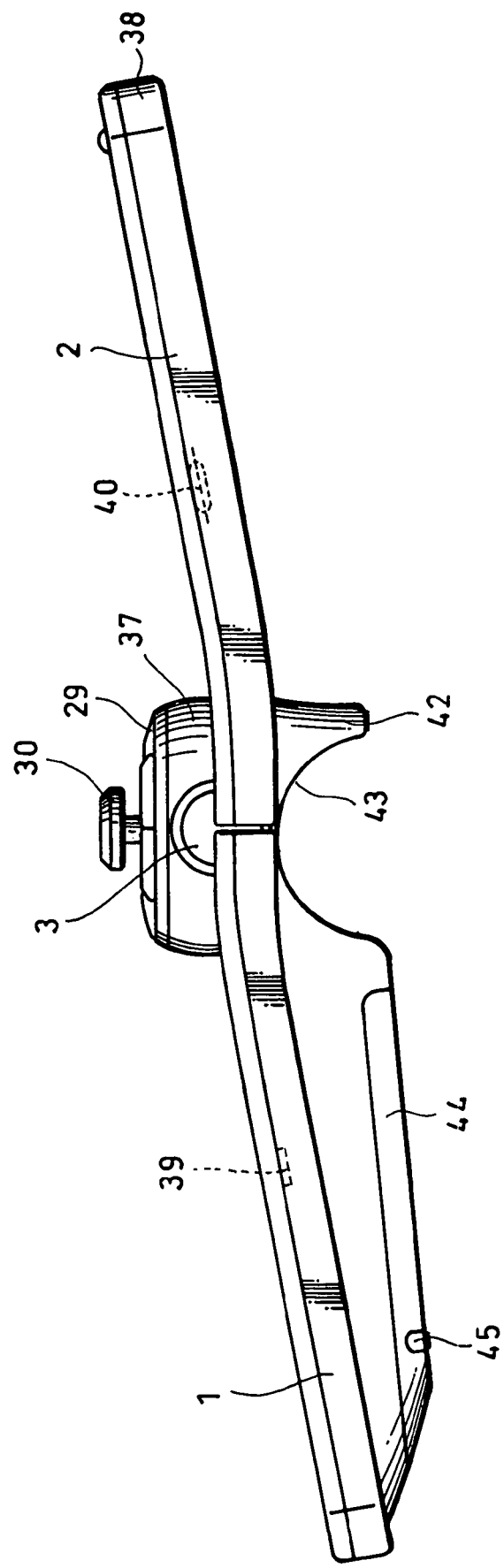
FIG. 7 is a side view of a remote controller when opened.

FIG. 1 is a perspective view showing the top view of a remote controller when folded up. FIG. 2 is a plan showing the top view of a remote controller when folded up. FIG. 3 is a perspective view showing the bottom view of a remote controller. FIG. 4 is a perspective view showing a remote controller when half-opened. FIG. 5 is a perspective view showing the top view of a remote controller when fully opened. FIG. 6 is a plan showing the top view of a remote controller when opened. FIG. 7 is a side view of a remote controller when opened.

The remote controller according to this embodiment composes of a remote controller's main housing section 1 as the first operation housing and a remote controller's movable housing section 2 as the second operation housing, in the main housing section 1, a joystick control section is provided. The remote controller's main housing section 1 and the remote controller's movable housing section 2 are respectively connected at the end of one side by a hinge section 3. As shown in FIG. 1, the remote controller's movable housing section 2 can be folded to the remote controller's main housing section 1 with the hinge section 3 used as a fulcrum. And, as shown in FIG. 5, these two sections can be opened to be substantially on the same plane and folded back freely.

Here, the functions of the operation buttons mounted on the main surface of the remote controller's movable housing section 2 will be described. A display section composed of, for example, crystal liquid display panel is indicated by 4, on which letters stood for a device to be controlled by a remote controller is displayed, for example, "TV" is displayed when the device is a TV set and "VTR" when the device is a video player. On the top of the display section 4, the operation button 5 for "silence", the operation button 6 for "image display", the operation button 7 for "sound switching", and the operation button 8 for "power" are provided. On the side of the display section 4, the operation button 9 for "operation switching", which switches the device to be operated, is provided.

At the bottom of the display section 4, an "analogue" operation button 10 for selecting channels of surface wave analogue broadcast, a "digital" operation button 11 for selecting channels of surface wave digital broadcast, a "BS" operation button 12 for selecting channels of BS broadcast, and a "CS" operation button 13 for selecting channels of CS broadcasting are provided. Moreover, the following are further provided: a channel switching button group 14 for switching channels consisted of buttons from "1" to "12" for switching the channel of the device with a tuner mounted, a volume adjusting button 15 and "input switching" operation button 16 for switching between TV and video.

As shown in FIG. 2, at the back of the remote controller's movable housing section 2, a "silence" operation button 17, a "TV power" operation button 18, a volume adjusting button 19 and a channel switching button 20 are provided.

On the other hand, on the main surface of the remote controller's main housing section 1, an operation button group 21 for reproducing/recording for video devices, DVD players or hard disc recorders, etc., is provided. At the bottom of this operation button group 21, an operation button 22 for displaying a menu, an operation button 23 for selecting devices when operating a combined device such as DVD incorporated video recorder, etc., and in addition, an operation button 24 for wide-screen switching, an operation button 25 for power consumption, an operation button 26 for volume mode, and an operation button 27 for picture quality mode, are provided. Moreover, in the cases of digital broadcasting and so on, an operation button 28 is provided for responding to the indication displayed on the screen.

Here, the joystick controller that is the characteristic part of the remote controller of this embodiment is described. The joystick control section 29 that has the function of Cross Media Bar (XMB) (a registered trademark) is provided in the remote controller's main housing section 1, so as to be formed with that housing section into a single body and positioned protruding from the spindle of the hinge section 3. Therefore, the hinge section 3 is arranged as a pair on both the left and right sides of the joystick control section 29.

The function of Cross Media Bar, for example when operating the joystick control section 29, is indicated by a cross in a menu image formed by a plurality of icons in the audio-visual image of a TV. This menu can be selected by pointing the cursor at a pre-determined menu image.

The following is a more detailed description of the joystick control section 19. At the center of the joystick control section 29, there is a joystick 30 having a decision button 30a that moves perpendicular to the paper surface (Z direction). The joystick 30 further has the function of switching, which is carried out by swinging in the up/down direction or the left/right direction (X-Y direction). Moreover, in the circumference section of the joystick 30, a "home" operation button 31 for displaying a menu image for home (for ground wave analogue broadcast), an "option" operation button 32 for displaying the next menu image through a shortcut (jump) without returning to the original menu image, a "memo" operation button 33 for displaying a memo image, a "return" operation button 34 for returning to a previous screen image, and a "program" operation button 35 for displaying a TV program, are provided. Said joystick control section 29, only by itself, is capable of performing the same operation as each operation button provided on the remote controller's main housing 1 and the remote controller's movable housing section 2. For example, by using the joystick control section 29 and the operation buttons mounted on the back of the remote controller's movable housing section 2 when the remote controller's movable housing section 2 is folded up, the same operations as those by using the operation buttons on the main surfaces of the remote controller's main housing section 1 and the remote controller's movable housing section 2 can be performed.

By providing said joystick control section 29 on the hinge section 3 of the remote controller's main housing section 1, the remote controller's movable housing section 2 is formed with a crescent-shaped cut notch section 36 so that the side of its hinge section 3 side avoids the joystick control section 29. When the remote controller's movable housing section 2 is in the folded up condition, the circumference section of the joystick control section 29 is exposed from the remote controller's main housing section 1 and the remote controller's movable housing section 2, as shown in FIG. 1.

According to the described configuration, the notch section 36 rotates crossing over the joystick control section 29 while the remote controller's movable housing section 2 is being folded or opened, as shown in FIG. 4. However, since the gap between the joystick control section 29 and notch section 36 is extremely small, it is impossible that user's finger or any foreign matter comes into the gap between the joystick control section 29 and the notch section 36 when the remote controller's movable housing section 2 has been opened.

Moreover, in the described remote controller, two transmitting sections 37, 38 for transmitting infrared signal or the likes to a receiving section of TV or video player re provided. The transmitting section, for example, is composed of light emitting diode (LED). The first transmitting section 37 is positioned at the exposed semi-circular part of said circumference section of the joystick control section 29. The second transmitting section 38 is positioned at the front end of the opposite side of the hinge section 3 of the remote controller's movable housing section 2.

In other words, the two transmitting sections 37, 38 are switched over to transmit signal in such a way that the first transmitting section 37 transmits the signal a (refer to FIG. 1) when the remote controller's movable housing section 2 is folded up; and the second transmitting section 38 transmits the signal b when the remote controller's movable housing section 2 is opened, for in this case the first transmitting section 37 is interrupted by the remote controller's movable housing section 2, hence its directionality is very poor, as shown in FIG. 5.

As the means for switching the first and second transmitting sections 37, 38, a reed switch (also called proximity switch) that is made to be ON or OFF by the magnetic force of a permanent magnet is used. For example, a permanent magnet 39 is mounted on a wiring board (not illustrated) of the remote controller's main housing section 1 and a reed switch 40 is mounted on a wiring board (not illustrated) of the remote controller's movable housing section 2, as shown in FIG. 7.

With such means for transmitting installed, when the remote controller's movable housing section 2 is folded up, the reed switch 40 is near the permanent magnet on the side of the remote controller's main housing section 1, the reed switch 40 comes under the influence of the magnetic field of the permanent magnet and is turned on, and the first transmitting section 37 is thereby able to transmit the signal a. And when the remote controller's movable housing section 2 is opened, the reed switch 40 is out of the influence of the permanent magnet on the side of the remote controller's main housing section 1, the reed switch 40 is thereby turned off, which causes the second transmitting section 38 is able to transmit the signal b. In this way, the undesired consumption of battery power can be suppressed.

Figure 8:
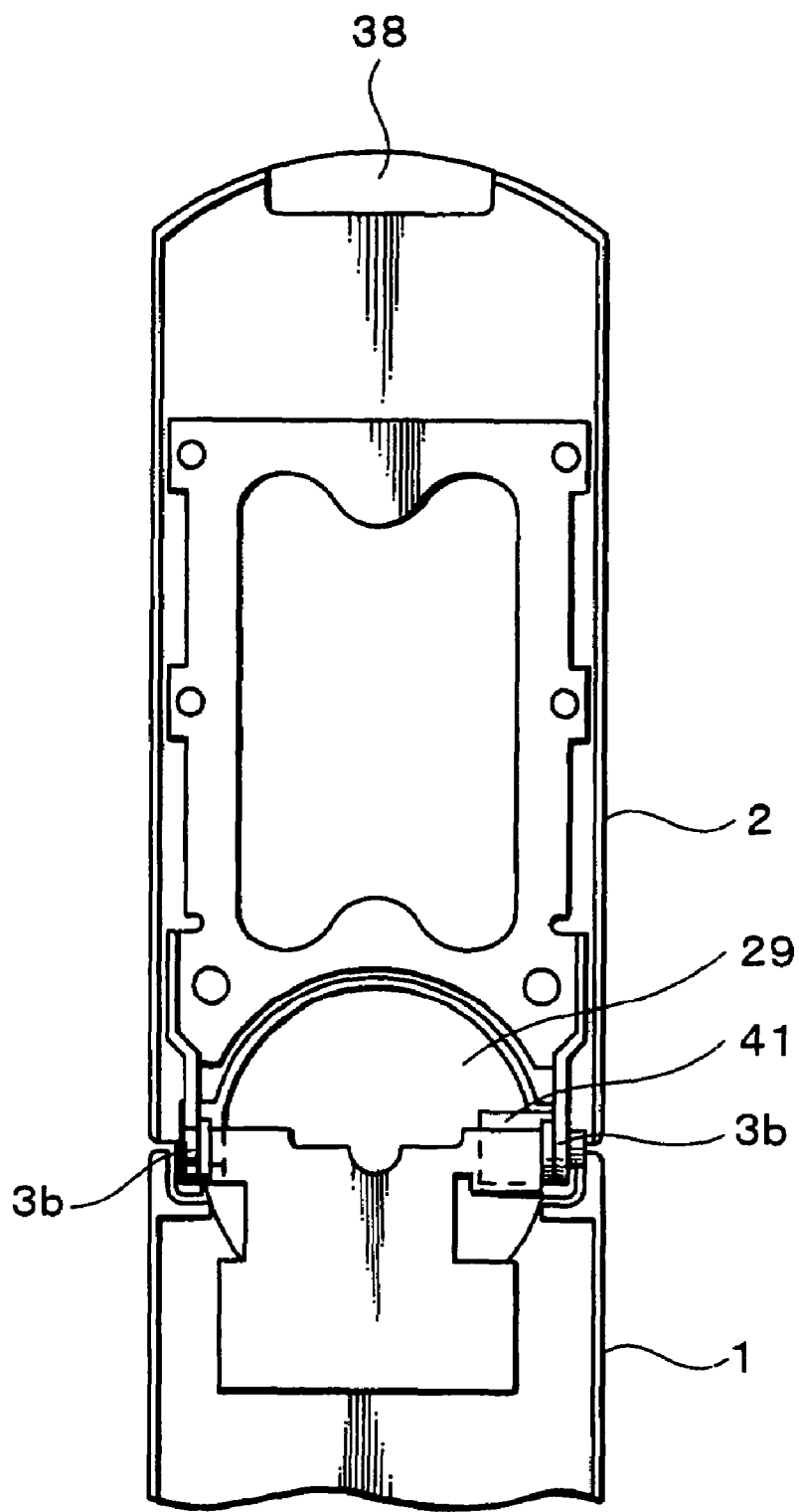
FIG. 8 is a plan showing the structure of the hinge section.

FIG. 8 shows the structure of the hinge section 3 arranged as a pair on both the left and right sides of the joystick control section 29. Here, the left and right hinge parts are shown by 3a, 3b. The one side's hinge part 3a works as a bearing shaft, and in the other side's hinge part 3b, a friction mechanism 41 which is in the inner side of and coaxial with the bearing shaft is provided. In other words, by providing the friction mechanism 41 in the hinge section 3, immediately before being folded up or opened up, the remote controller's movable housing section 2 is forced in the corresponding directions, thereby the folded up or opened up positions can be reliably maintained.

Moreover, since the friction mechanism 41 is arranged in the inner side of the bearing shaft section of the hinge part 3b, this friction mechanism 41 can be contained in the housing space of the joystick control section 29, therefore the hinge section 3 itself does not thrust out from the remote controller's hinge section 1, and does not affect the external appearance of the remote controller.

Furthermore, on the back surface part of the remote controller's main housing section 1 on the side of the joystick control section 29, a nose section 42 is provided at the front end part as shown in FIG. 3. A semi-circular-shaped concave section 43 is formed from the nose section 42 to the back surface of remote controller's main housing section 1. When the remote controller's main housing section 1 is held, this concave section 43 can be easily buckled with user's index finger.

Moreover, the remote controller's main housing section 1 has a place for power supply at its back surface, for example, a battery containing section for dry batteries and the likes. The battery can be replaced by opening and closing the battery cover 44.

Moreover, as shown in FIG. 3, the remote controller can be stably supported by three points, which are the front end of the nose section 42 with the concave section 43 formed, and two bearing surfaces 45, 45 formed on the battery cover 44.

In this embodiment, the sub-substrate 70 (refer to FIG. 9) is installed in the remote controller's main housing section 1, as the first operation housing mainly held by the remote controller's user, with the joystick control section 29 mounted, as shown in FIG. 10A. And in the remote controller's movable housing section 2 as the second operation housing is installed the main substrate 71, as shown in FIG. 10A, B.

Figure 9:
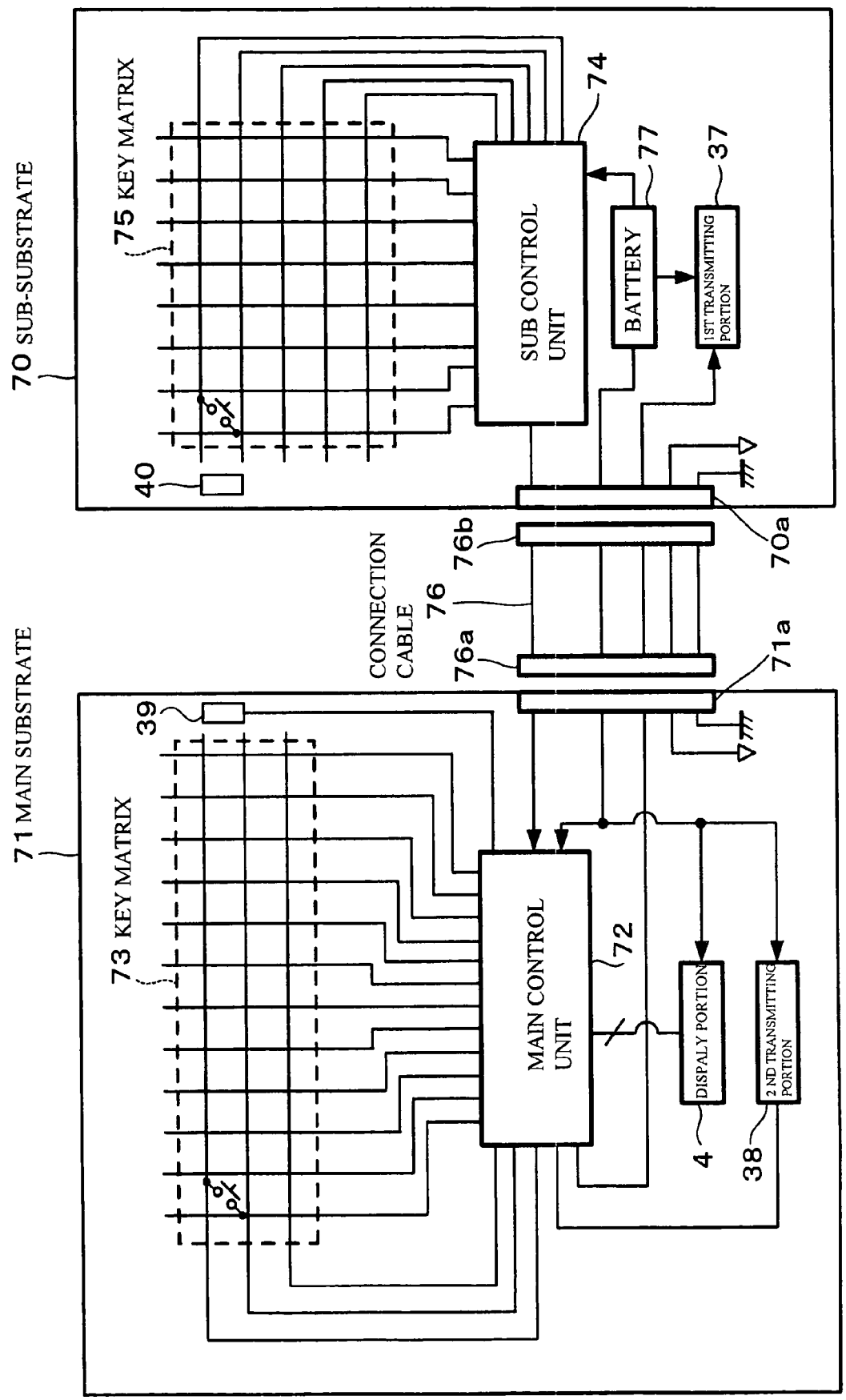
FIG. 9 is the configuration of the preferred embodiment for the inputting apparatus according to this invention.

To describe with reference to FIG. 9, 72 stands for the main control unit composed of microcomputer mounted on the main substrate 71, to this main control unit 72 the key code signals from the key matrix 73 arranged on the one surface and the another surface of this substrate 71.

This key matrix 73 controls the keys corresponding to operations of the input button group provided on the remote controller's movable housing section 2 as shown in FIG. 10A, the group comprising the "silence" operation button 5, the "screen image display" operation button 6, the "sound switching" operation button 7, the "power supply" operation button 8, the "operation switching" operation button 9, the "analogue" operation button 10, the "digital" operation button 11, the "BS" operation button 12, the "CS" operation button 13, the channel switching button group 14, the volume adjusting button 15, and the "input switching" button 16. The key-corresponded key code signals from the key matrix 73 are supplied to the main control unit 72.

Moreover, this key matrix 73, as shown in FIG. 10B, controls the keys corresponding to the operations of the input button group provided on the back of the remote controller's movable housing section 2, the group comprising the "silence" operation button 17, the "TV power supply" operation button 18, the volume adjusting button 19, and the channel switching button 20. The key-corresponded key code signals from the key matrix 73 are supplied to the main control unit 72.

In this main control unit 72, a control code signal corresponding to the key code signal of the operated input button is generated.

Moreover, 74 stands for the sub-control unit composed of microcomputer mounted on the sub-substrate 70, to this sub-control unit 74 key code signals from the key matrix 75 mounted on the sub-substrate 70 is supplied.

The key matrix 75, as shown in FIG. 10A, controls the keys corresponding to the operations of input button group provided on the main surface of the remote controller's main housing section 1, the group comprising the operation button group 21 for reproduction/recording, the operation button 22 for menu display, the operation button 23 for device selecting, the operation button 24 for wide screen switching, the operation button 25 for consumption power supply, the operation button 26 for volume mode, the operation button 27 for picture quality, and the operation button 28 for responding to indications on screen image. The key-corresponded key code signals from the key matrix 75 are supplied to the main control unit 74.

Moreover, this key matrix 75 controls the keys corresponding to the operations of the input button group provided on the joystick control section 29 as shown in FIG. 10 A, B, the group comprising the decision button 30a, the "home" operation button 31, the "option" operation button 32, the "menu" operation button 33, the "return" operation button 34, and the "program table". The key-corresponded key code signals from the key matrix 75 are supplied to the sub-control unit 74.

In this sub-control unit 74, the key code signals of the input button are converted into serial data, and the serial data are supplied to main control unit of the main substrate 71 via the connection cable 76. The transmission of the serial data from the sub-control unit 74 to the main control unit 72 of the main substrate 71 can be carried out by one line within the connection cable 76.

Figure 11:
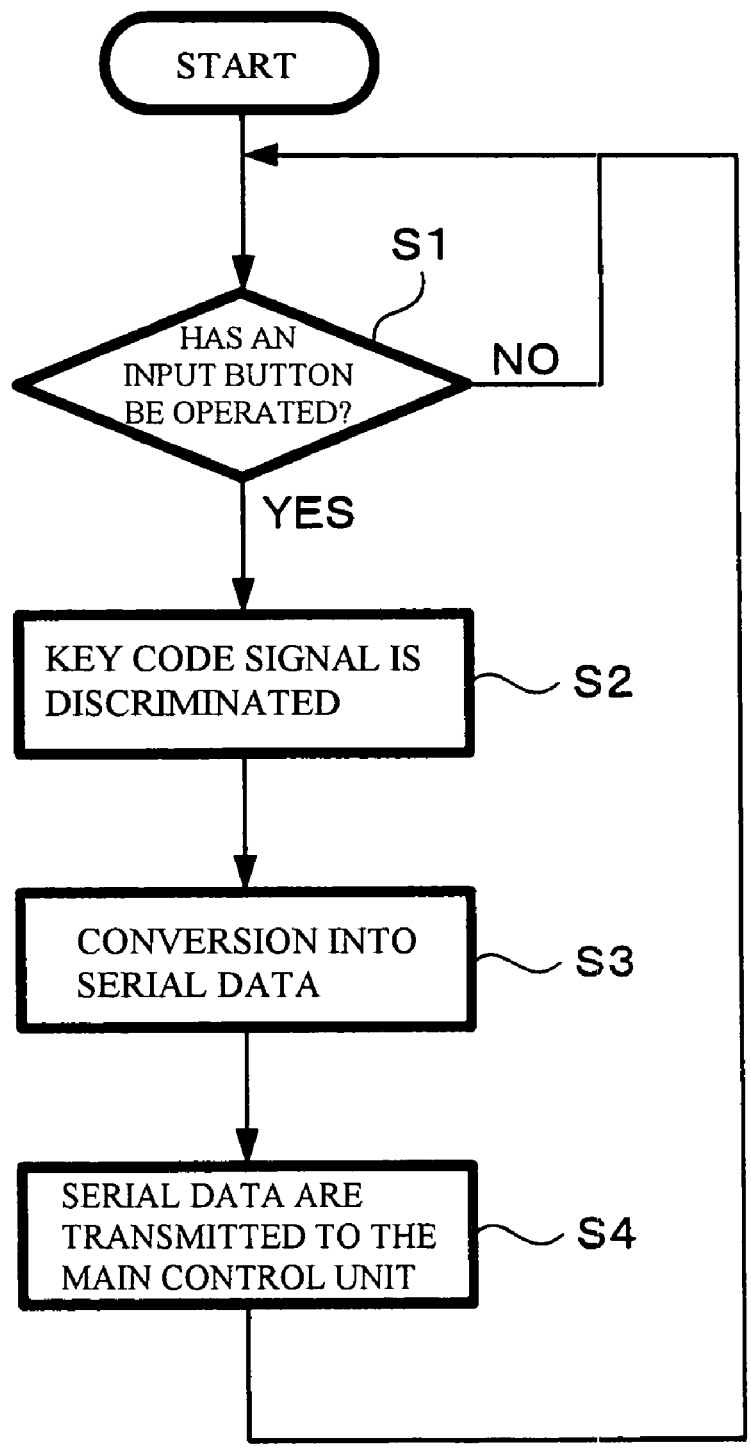
FIG. 11 is a flow chart for illustrating this invention.

Now operations of the sub-control unit 74 are to be described with reference to FIG. 11. After starting, to judge whether or not an input button of the input button group on the remote controller's main housing section 1 and of the input button group of the joystick control section 29 (Step S1) has been operated, if not operated, this status is repeated.

At Step S1, if any input button was operated, the key code signal of this operated input button is discriminated (Step S2), then this key code signal is converted into serial data corresponding to this key code signal (Step S3), and afterwards the serial data are transmitted to the main control unit 72 on the main substrate 71 (Step S4), then processing is returned to Step S1.

At the main control unit 72, control code signals corresponding to the serial data from the sub-control unit 74 are generated.

The control code signals generated at the main control unit 72 is supplied to the second transmitting section 38 composed of infrared diode mounted on the end section (i.e. the end section of the main substrate 71) opposite to the hinge section 3 of the remote controller's movable housing section 2, and also supplied, via the connection cable 76, to the first transmitting section 37 composed of infrared light emitting diode mounted at the half-circle part of the circumference section (i.e. the end section of the sub-substrate 70 on the side of the joystick control section 29).

The connection cable 76 is used to transmit control code signals from the main control unit 72 to the first transmitting section 37.

Moreover, on the main substrate 71, a display section 4 composed of a liquid crystal display panel is provided, and display signals from the main control unit 72 are supplied to the display section 4. If the device to be operated by the remote controller for example is TV, "TV" will be displayed; and if it is a video player, "VTR" will be displayed.

Moreover, as shown in FIG. 9, the battery 77 used as power supply is provided on the sub-substrate 70, the power from this battery 77 is supplied to the sub-control unit 74 and the first transmitting section 37, and the power from the battery 77 is also supplied to the main control unit 72, the second transmitting section 38 and the display section 4 via the connection cable 76. In this case, one line of the connection cable 76 is used for supplying the power.

Moreover, on the main substrate 71, a reed switch 39 of the remote controller's movable housing section 2 is provided. This reed switch 39 is directed to a permanent magnet 40 mounted on the sub-substrate 70 of the remote controller's main housing section 1 when the remote controller's movable housing section 2 has been folded up, as described above which causes the reed switch 39 on.

On/off signals of the reed switch 39 are supplied to the main control unit 72, and the main control unit 72 supplies control code signals from the main control unit 72 to the first transmitting section 37 when the reed switch 39 is on, and the signals are not supplied to the second transmitting section 38 and the display section 4 is not supplied with power, thereby the consumption power can be reduced.

When the reed switch 39 is off, the main control unit 72 supplies control code signals from the main control unit 72 to the second transmitting section 38, but not to the first transmitting section 37.

Figure 12:
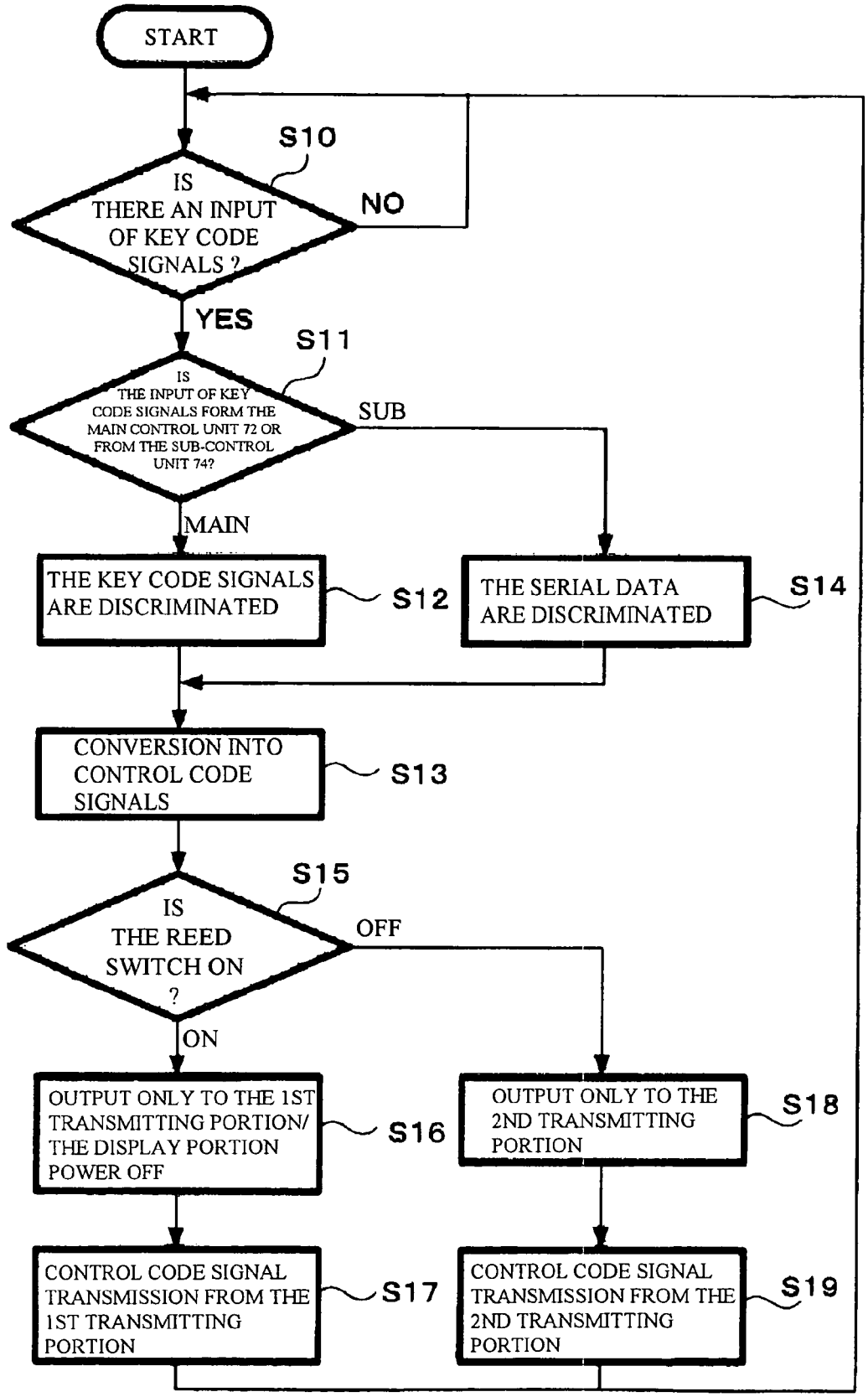
FIG. 12 is a flow chart for illustrating this invention.

Operations of the main control unit 72 are to be described with reference to FIG. 12. After starting, the main or sub-control units 72 or 74 determines whether there is an input of key code signals (Step S10). If there is no input of key code signals the determination is repeated, and if there is an input of key code signals, determine whether the input of key code signals is of the main control unit 72 or of the sub-control unit 74 (Step S11).

At Step S11, if it is the main control unit 72, the key code signals are discriminated (Step S12), then transferring to Step S13, and if it is the sub-control unit 74, the serial data are discriminated (Step 14), then transferring to Step S13.

At Step S13, the key code signals or serial data are converted into their corresponding control code signals respectively. After that, whether the reed switch 39 is on or off is determined. (Step S15)

If the reed switch 39 is on, the remote controller movable housing section 2 is in a state of being folded up, in which state the control code signals from the main control unit 72 are output only to the first transmitting section, not to the second transmitting section 38, and no power is supplied to the display section 4 (Step S16).

After that, control code signals are transmitted from the first transmitting section 37 to a device to be controlled, for example, to a receiving section of a TV set to perform desired control. Then, processing returns to Step S10.

Moreover, at Step S15, if the reed switch 39 is off, the main control unit 72 output control code signals only to the second transmitting section 38, not to the first transmitting section 37. After that, the control code signals are transmitted by the second transmitting section 38 to an electronic device to be controlled, for example to a receiving section of a TV set to perform a desired control. In FIG. 9, 70a stands for a connector of the sub-substrate 70, which couples with the another side connector 76b of the connecting cable, and 71a is a connector of the main substrate 71, which couples with the one side connector 76a of the connecting cable 76.

According to this embodiment, the sub-substrate 70 based sub-control unit 74 discriminates which input button in the input button group of the remote controller's main housing section 1 is operated, and the signals are converted into serial data corresponding to the operated input button and transmitted to the main control unit 72 on the main substrate 71. Therefore, in this embodiment the connection cable 76 can be reduced to five lines, which are the line for transmitting the serial data, the line for supplying power from the battery 77, the line for sending control signals to the first transmitting section 37, the line for battery's grounding, and the line for chassis' grounding.

Therefore, according to this embodiment, the number of lines of the connecting cable coupled between the sub-substrate 70 and the main substrate 71 can be reduced to, for example, 5 lines. This connecting cable 76 can be installed in such a way that the cable goes through a hole provided at the center of the shaft of the left hinge part 3a of the hinge section 3, which simplifies the structure and improves the reliability due to the reduction of lines.

Moreover, because of the lines are not many, the cost for the connecting cable 76, connectors 76a, 76b, 70a, and 71a can be lowered.

Figure 14:
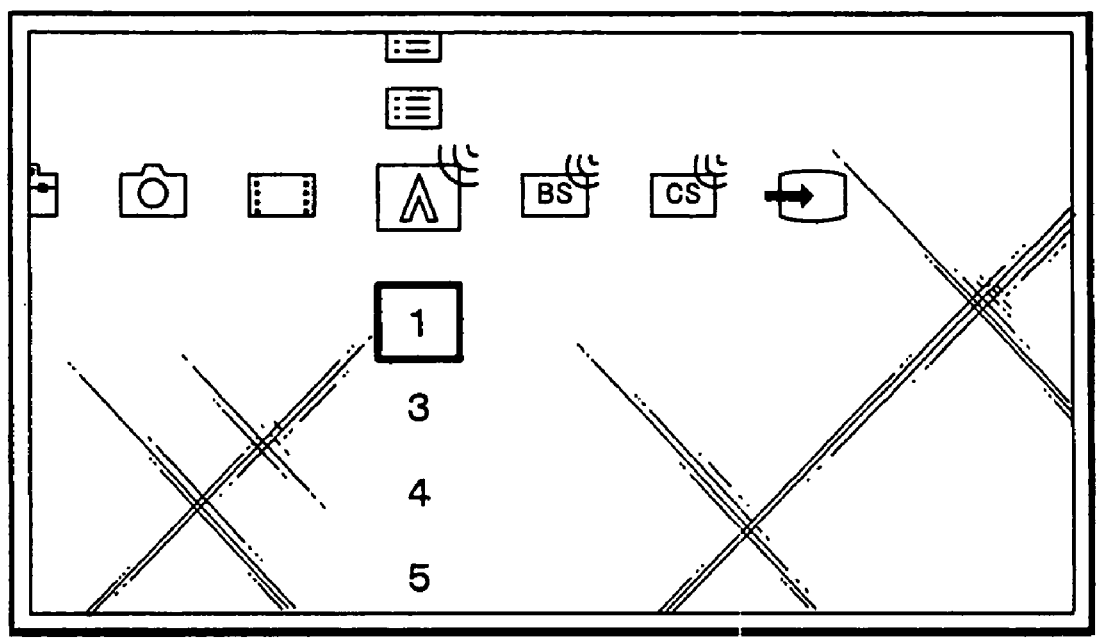
FIG. 14 is the menu image of Cross Media Bar when the "home" button of the joystick control section has been operated.
Figure 15:
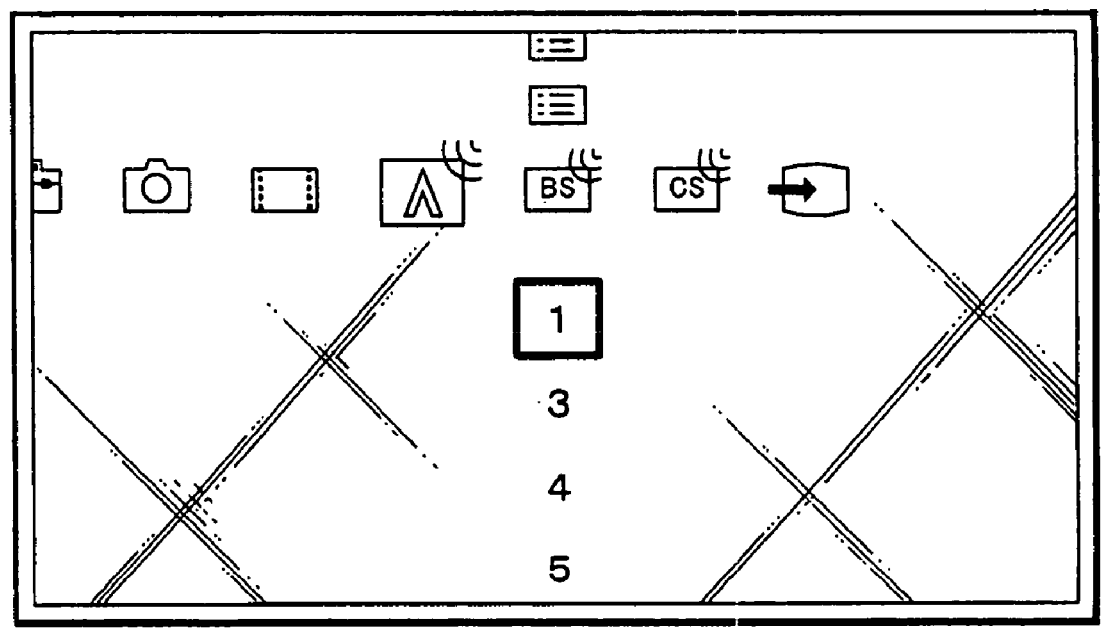
FIG. 15 is the screen image when "BS" has been selected from the menu image shown in FIG. 14.
Figure 16:
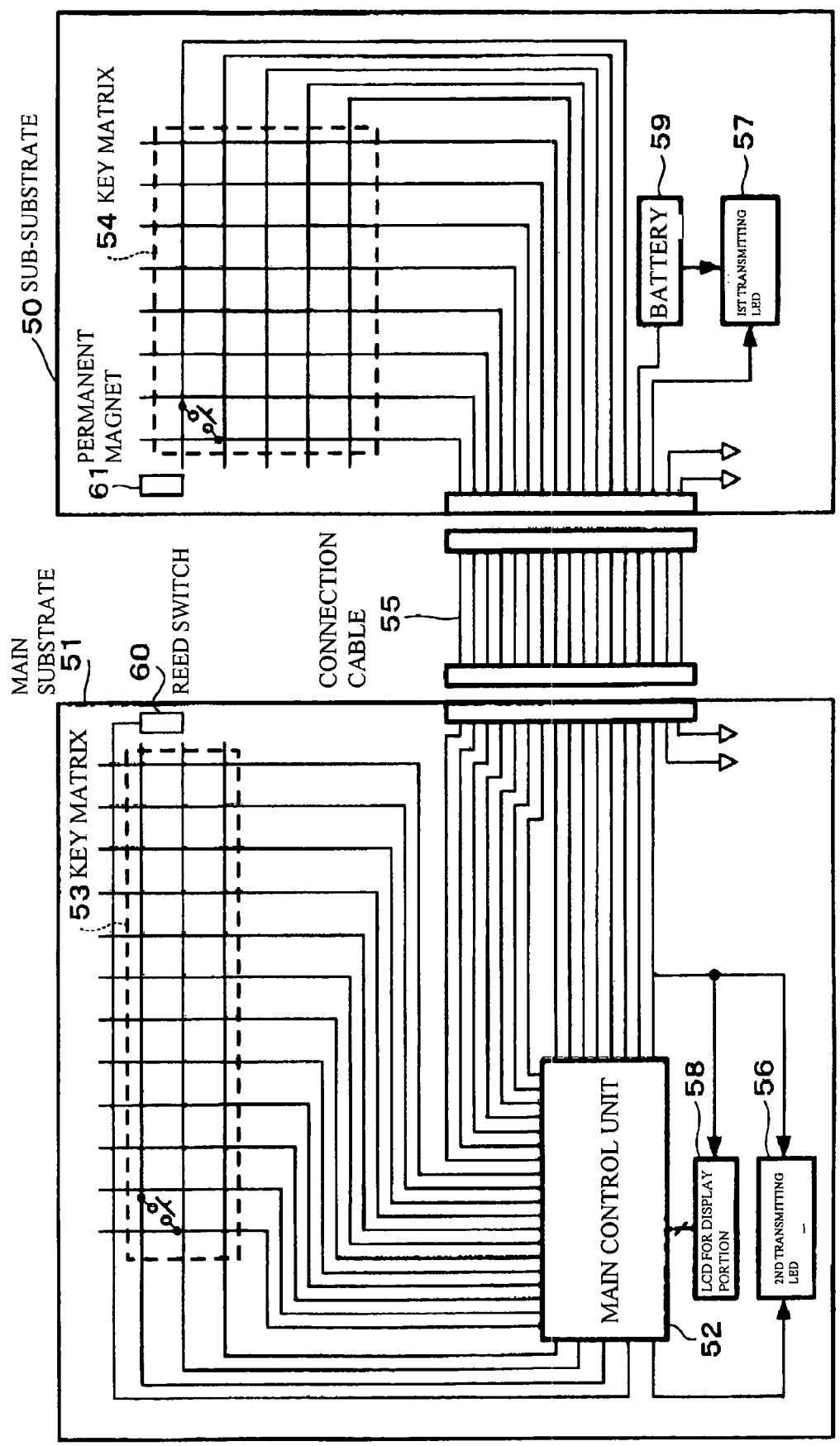
FIG. 16 is an exemplary configuration showing the inputting apparatus.

Here, with reference to FIG. 14 and FIG. 15, an example in which channels of TV broadcasting are selected by operating the joystick control section 29 is described.

For example, the operation sequence when switching from a state of receiving Channel "1" of the ground wave analogue broadcasting to BS digital broadcasting is as follows. First, if the "home" button 31 of the joystick control section 29 is operated when receiving the ground wave analogue broadcasting, a menu image of Cross Media Bar is displayed, as shown in FIG. 14. Categories displayed along the horizontal line in this menu image from left are "Setting", "Photo", "Video", "Ground wave", "BS", "CS", and "External Input". When the "home" button 31 is operated, a focus F is displayed below the category icon of "ground wave", and inside this focus F, each of the channel number of "1", "2", "3", "4" and "5" of the ground wave broadcasting is displayed. Moreover, above the category icon a program table is displayed. By displaying the channel number "1" inside the focus F, the state of receiving the ground wave broadcasting can be identified.

Furthermore, on the menu image, by operating the joystick 30 to the downwards arrowhead side, inside the focus F, the channel number of "3" or "4" moves. Then, by operating the decision button 30 of the joystick 30, the channel "3" or "4" of the ground wave broadcast can be received.

Then, in order to select a BS digital broadcasting channel from the menu image of FIG. 14, joystick 30 is operated to the direction indicated by the leftwards arrowhead, which causes the focus F to move to the "BS" category icon and the menu image changes to FIG. 15. And below the "BS" category icon, "1", "2", "3", "4", and "5" are displayed. In FIG. 15, channel "1" is focused by the focus F. The channel "1" means BS1. Here, by operating the decision button of the joystick 30 at channel "1", the Cross Media Bar disappears and BS1 channel of the BS digital broadcast is being received.

Then, when selecting a channel, the "home" button 31 of the joystick control section 29 is operated, and the joystick 30 is operated on the basis of the screen image of Cross Media Bar as shown in FIG. 14. In this way, the broadcasting of a predetermined channel can be selected.

Furthermore, in the above described embodiment, an example of the remote controller operating a TV set and a video player is illustrated, but a wide range of other devices such as DVD players or DVD-incorporated video players can also be operated by the remote controller.

It is to be understood that the embodiments described herein does not mean any limitation of this invention and other various modifications may be implemented without departing from the scope and spirit of the invention.

What is claimed is:

1. An inputting apparatus of the folding type, comprising a first operation housing and a second operation housing coupled together by a hinge section, the first operation housing has a first button group consisted of a plurality of input buttons and is mainly held by the user, the second housing has a second button group consisted of a plurality of input buttons, characterized in that in said second operation housing, a main substrate on which a main control unit is mounted is provided and in said first operation housing, a sub-substrate on which a sub-control unit is mounted is provided, said sub-control unit determines which input button in the first input button group on the first operation housing has been operated, makes a conversion into the serial data corresponding to this operated input button, and transmits the serial data to the main control unit on the main substrate.

2. An inputting apparatus according to claim 1, characterized in comprising a joystick control section, which is integrated with said first operation housing into a single body and positioned on the spindle of said hinge section, and having on circumference section a third input button group consisted of a plurality of input buttons capable of performing the operation functions corresponding to said first input button group and said second input button group, said joystick control section is exposed in any of the conditions in which said second operation housing is folded up or opened up, and is capable of input operation.

3. An inputting apparatus according to claim 2, characterized in that in said second operation housing, a forth input button group consisted of a plurality of input buttons is provided, which can be operated in a condition in which said first input button group and said second input button group are covered due to overlap when being folded to said first operation housing by using the hinge section.

4. An inputting apparatus according to claims 1, characterized in that a first transmitting section that becomes the signal transmitting section when said second operation housing is folded up, and a second transmitting section that becomes the signal transmitting section when said second operation section is opened up are provided.

5. An inputting apparatus according to claim 4, characterized in that said first transmitting section is provided at said hinge section, and said second transmitting section is provided at the front end section of said second operation housing.

6. An inputting apparatus according to claim 4, characterized in that said first transmitting section and second transmitting section are switched under the conditions that said second operation housing is folded up and opened up.

7. An inputting apparatus according to claims 1, characterized in that said inputting apparatus is the remote commander of a remote operation apparatus of an electronic device.

* * * * *